April 28, 1931. A. F. PAUL 1,802,926

TRAPDOOR AND STEP CONTROL MECHANISM FOR PASSENGER CARS

Filed Nov. 8, 1929 2 Sheets-Sheet 1

Inventor
Abram Frank Paul
By his Attorneys
Darby & Darby

April 28, 1931. A. F. PAUL 1,802,926
TRAPDOOR AND STEP CONTROL MECHANISM FOR PASSENGER CARS
Filed Nov. 8, 1929 2 Sheets-Sheet 2
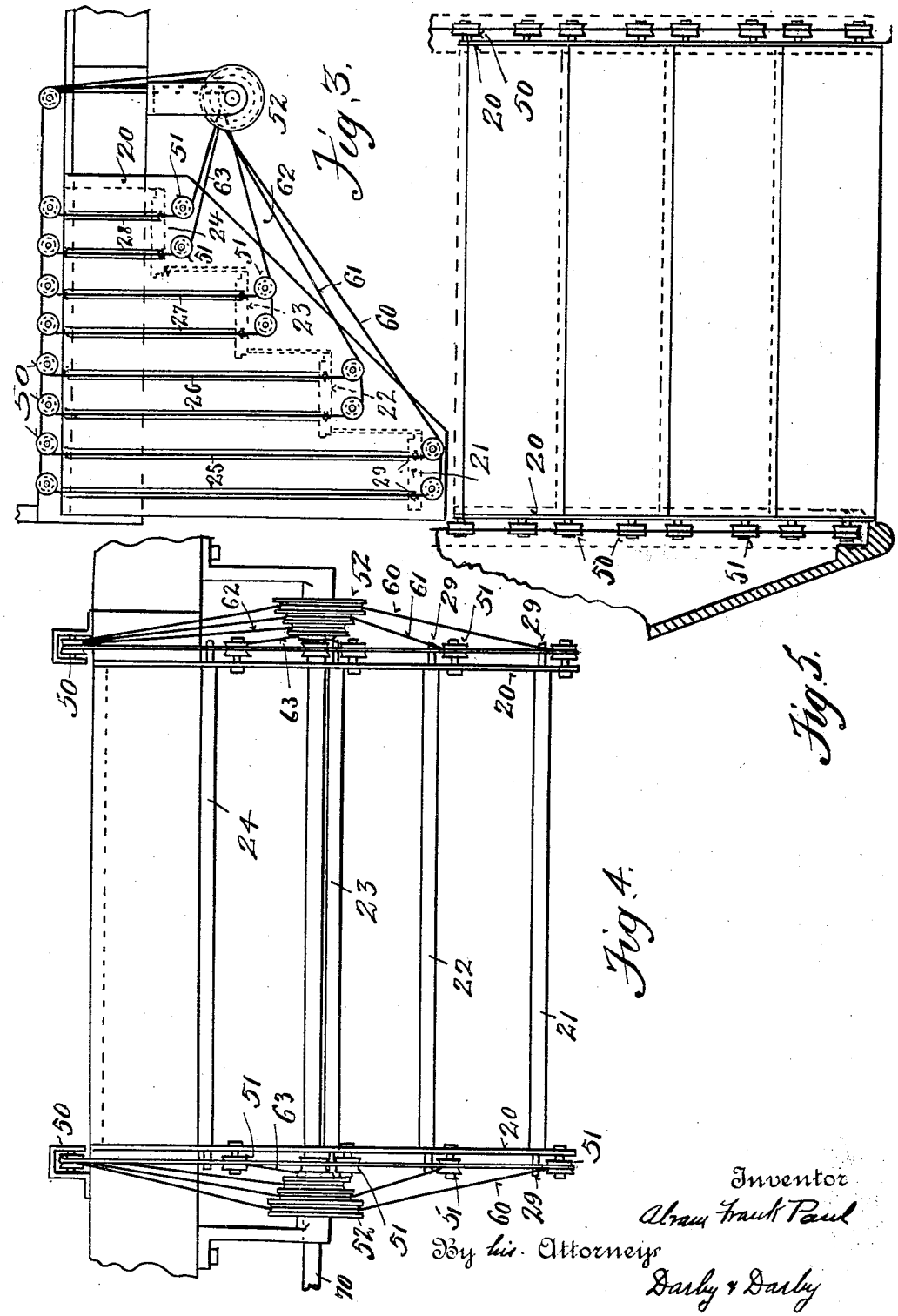

Patented Apr. 28, 1931

1,802,926

UNITED STATES PATENT OFFICE

ABRAM FRANK PAUL, OF LLANERCH, PENNSYLVANIA, ASSIGNOR TO NATIONAL PNEUMATIC COMPANY, OF NEW YORK, N. Y., A CORPORATION OF WEST VIRGINIA

TRAPDOOR AND STEP CONTROL MECHANISM FOR PASSENGER CARS

Application filed November 8, 1929. Serial No. 405,794.

This invention relates to an improved trap door and step construction for passenger cars, and has for its object the provision of means for moving the treads of car steps simultaneously, but at different speeds, so as to bring said treads uniformly from stair position to trap door forming position and then again into stair forming position to take care of low level or high level platforms and to protect passengers from unguarded car stairs.

In a preferred form of construction the step treads are confined between two fixed plates which are provided with slots wherein extend projections from the ends of the step treads to guide and limit the steps in their vertical movements. The treads are moved simultaneously by a system of levers of proportional lengths so as to bring all of the treads into position at the same time.

In another construction the treads are moved simultaneously at different speeds through the varying distances by a system of flexible cables which are supported and operated by pulleys and drums. For this purpose I provide a series of flexible cables, preferably two, for either end of each tread, to which said treads are fastened so as to move up or down the proper distance for each tread to form either the car stairs or the trap door to cover the trap or stair well. The cables pass over a series of pulleys above and below the fixed limits of the treads, and then over drums of circumferences that vary in proportion with the distances through which the treads move.

The above named and other objects are accomplished by the constructions shown by way of illustration, in the accompanying drawings, in which Figure 1 is a view taken on the line 1—1 of Fig. 2 and showing the stair treads in stair formation;

Fig. 3 is a side view of a stair step construction wherein the steps are moved by a system of cables and drums;

Fig. 4 is a rear view of the construction shown in Fig. 3, and

Fig. 5 is a plan view showing the stair treads in trap door formation.

Like reference numerals refer to the same parts wherever they occur throughout the several views.

Figure 1:
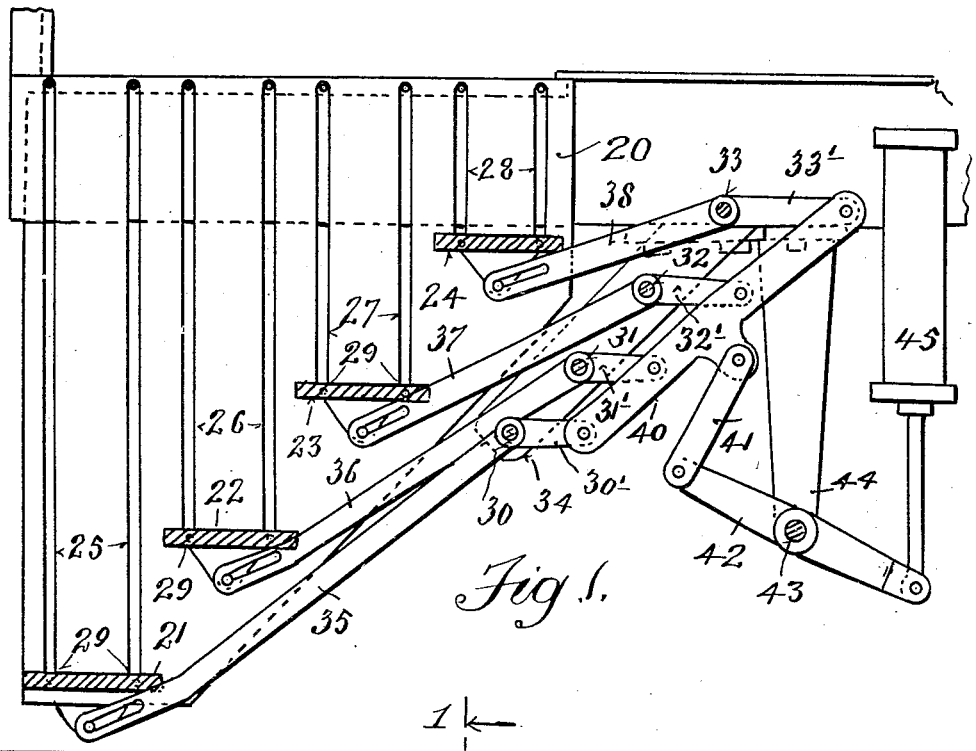

It is one of the chief objects of my invention to provide a construction of trap door and stairs which can be controlled from a distance and operated with safety to the passengers. The construction affords means whereby the traps on railway cars are protected and closed while the cars are in motion and can then be immediately opened while the train comes to rest thereby permitting the passengers to pass out over the trap door for high level platforms, or permitting the trap to be lowered into stair formation to enable passengers to pass in and out from low level platforms.

In a specific form of construction illustrated in the accompanying drawings I accomplish the purposes of my invention by a system of levers properly supported and operated by suitable means. Instead of the levers I propose to operate the trap and stair construction by a system of flexible cables on the equipment. In any event, it is my purpose to move the stair treads all at the same time, but at different rates of speed, so as to simultaneously be brought into trap door formation or into stair formation as the case may be.

Referring now to the drawings, the stair construction herein disclosed by way of illustration comprises two fixed plates 20, 20 suitably supported from the car frame so as to form the sides of the stair well. These plates are provided with slots of varying lengths indicated by numerals 25, 26, 27 and 28 for supporting and guiding the treads of the stair steps 21, 22, 23 and 24. These treads are held in position by pins or projections 29 extending from the ends of each tread.

Figure 2:
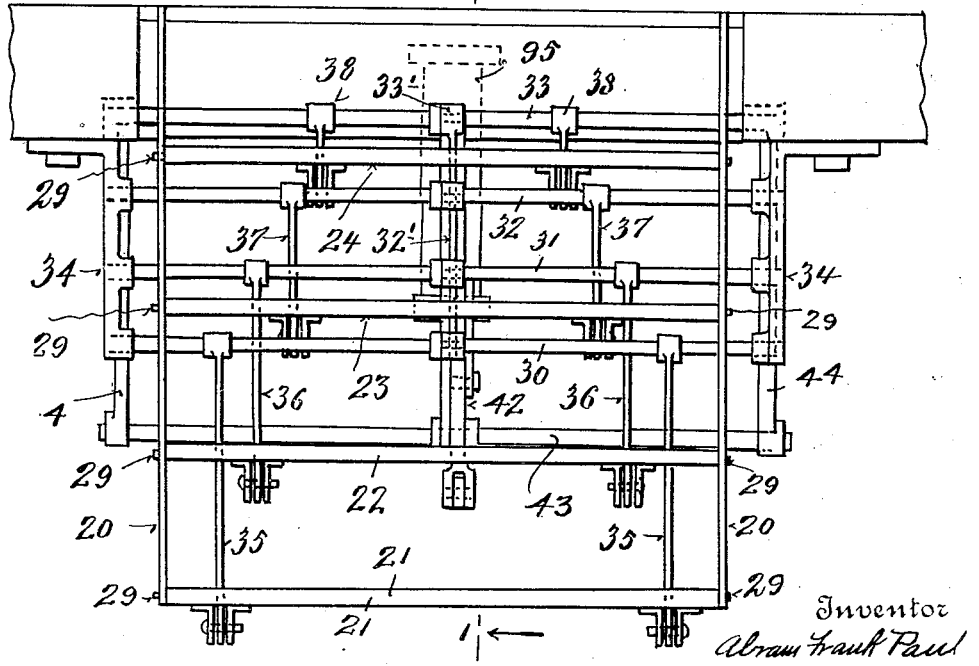
Fig. 2 is a front view looking in on the stair steps from a low level station platform.

In the construction of Figs. 1 and 2 the treads are moved up and down by a system of levers supported in counter shafts 30, 31, 32 and 33. These counter shafts are supported in brackets 34 and are provided with link arms 35, 35 for moving tread 21; 36, 36 for moving tread 22; 37, 37 for moving tread 23; and 38, 38 for moving tread 24. It will be noted that link arms 35, 35 are of greatest length, and link arms 38, 38 are of shortest length, and the intermediate links are of intermediate lengths to thereby accommodate each of the several treads which are moved up and down through their varying distances.

Each of the counter shafts 30, 31, 32 and 33 has affixed thereto a link arm designated respectively, by numerals 30', 31', 32' and 33'. It will be noted that link arm 30' is of shortest length, while link arm 33' is of greatest length, and the intermediate links are of intermediate length. These links are pivotally connected to a key-link 40 which is operated through a toggle link 41 and a rocker link 42 pivoted on shaft 43 and supported from brackets 44 to be operated by a suitable operating mechanism such as motor 45.

From the disclosure thus far given it is apparent that as link 42 is rocked the same will transmit its motion through toggle link 41 to the key-link 40 thereby pulling the same in a downward position and rocking the series of link arms on their counter shafts through varying distances and at varying rates so as to bring the treads of the step up into trap door formation at the same time. Obviously when the trap is to be opened the motion is reversed and continued so as to move all of the steps simultaneously through their respective distances and bring them into their fixed position at the same time.

In Figs. 3, 4 and 5 I have disclosed a system of flexible cables, pulleys and drums for accomplishing my purpose. To this end I provide cables to which the step treads are attached and by which they are moved up and down into their respective positions through the different distances and at different rates of speed so as to reach their positions either that of stair forming or of trap door forming, at the same time. The flexible cables are operated by drums and pulleys which are fastened on opposite ends of the stairway plates 20, 20. Since the distances through which the treads travel vary I provide a drum having different operative diameters over which the respective cables for each step pass. It is evident that when the drums are rotated in either direction that the steps will move accordingly and their speed, as well as the distances moved, will vary with the diameters of the respective drums.

Referring now to Figs. 3, 4 and 5 the side plates 20, 20 are provided as in the construction above. The stair treads 21, 22, 23 and 24 are held and guided in their respective slots 25, 26, 27 and 28 by means of the pins or projections 29. At the upper end of the plates, immediately above the respective slots, there are provided pulleys 50 over which the cables operate. Similarly pulleys 51 are fastened near the bottom of the plates beneath the several slots in plates 20, 20 and the cables extend over the pulleys and the drums which are divided into pulley surfaces of varying circumferences for the respective cables. Thus, for example, the lowest step 21 is moved its distance by the two cables 60 which operate over the drums at their greatest diameter and, hence, tread 21 is moved a corresponding distance. Likewise tread 22 is moved by cables 61 which operate over the intermediate drum surfaces, step 23 is similarly operated by intermediate and shorter cables 62, and step 24 is operated by the shortest cables 63 and corresponding drum surface. The drums are rotated in either direction through suitable means, such as a motor shaft 70, operated by a suitable motor (not shown). The control of said motor or operating means for remotely controlling and operating the steps, traps or doors is accomplished by suitable controls known to the art, a specific example of which is disclosed in my copending application of even date, Serial No. 405,796, for remotely controlled trap door and steps for cars.

I claim:

1. In a trap door and step mechanism, the combination of plates spaced apart, independent and unconnected stair treads located between said plates, a lever for each tread connected thereto and means for moving each of said levers to move treads simultaneously from stair forming position into trap door forming position.

2. In a trap door and step forming mechanism, the combination of members spaced apart, treads located between said members, means on said members for guiding said treads when moved from step formation into trap door formation, and a plurality of cooperating levers one connected to each tread for moving said treads simultaneously at varying speeds to move said treads into the trap door formation or into the stair formation.

3. In a trap door and step forming mechanism, the combination of plates spaced apart, treads located between said plates, means on said plates for guiding said treads when moved from step formation into trap door formation, levers for each tread, and means for rocking said levers to move the treads from step formation to trap door formation.

4. In a trap door and step forming mechanism, the combination of plates spaced apart, treads located between said plates, means on said plates for guiding said treads when moved from step formation into trap door formation, tread moving members attached to each of said treads, said members varying in operative length directly with the distance through which its tread is moved.

5. In a trap door and step forming mechanism, the combination of plates spaced apart, treads located between said plates, means on said plates for guiding said treads when moved from step formation into trap door formation, tread moving members attached to each of said treads, said members varying in operative length directly with the distance through which its tread is moved, and means for simultaneously moving all of said tread moving members.

6. A trap door and step forming mechanism, comprising a number of independent stair treads disposed for movement from stair formation into trap door formation, a plurality of operable elements one connected to each tread, and means for operating said operable elements for moving said treads simultaneously from stair formation to trap door formation.

7. A trap door and step forming mechanism, comprising stair treads disposed for movement from stair formation into trap door formation, and a plurality of means one for each tread for moving said treads simultaneously at different speeds from stair to trap door formation and back to stair formation.

In testimony whereof I have hereunto set my hand on this 10th day of May A. D., 1929.

ABRAM FRANK PAUL.